United States Patent
Chang

(10) Patent No.: US 6,494,299 B2
(45) Date of Patent: Dec. 17, 2002

(54) AUTOMATIC COMPENSATION MECHANISM FOR BRAKE UNIT

(76) Inventor: Chin Ch'eng Chang, P.O. Box 82-144, Taipei (TW)

( * ) Notice: Subject to any disclaimer, the term of this patent is extended or adjusted under 35 U.S.C. 154(b) by 0 days.

(21) Appl. No.: 09/750,360

(22) Filed: Dec. 29, 2000

(65) Prior Publication Data

US 2002/0084151 A1 Jul. 4, 2002

(51) Int. Cl.[7] ............................................. F16D 55/18
(52) U.S. Cl. ..................................... 188/71.9; 188/72.4
(58) Field of Search ............................. 188/71.8, 71.7, 188/71.4, 26, 196 D, 196 V, 72.7, 72.9

(56) References Cited

U.S. PATENT DOCUMENTS

| | | | | |
|---|---|---|---|---|
| 3,913,708 A | * | 10/1975 | Newstead et al. | |
| 3,934,684 A | * | 1/1976 | Evans | 188/71.9 |
| 3,991,859 A | * | 11/1976 | Coulter et al. | 188/71.9 |
| 4,029,179 A | * | 6/1977 | Butz | 188/71.8 |
| 4,162,720 A | * | 7/1979 | Haraikawa | 188/71.9 |
| 5,000,294 A | * | 3/1991 | Hunnicutt et al. | 188/71.9 |
| 5,060,765 A | * | 10/1991 | Meyer | 188/71.9 |
| 5,868,225 A | * | 2/1999 | Hulliger | 188/72.4 |

* cited by examiner

Primary Examiner—Matthew C. Graham
(74) Attorney, Agent, or Firm—Leong C. Lei

(57) ABSTRACT

An automatic compensation mechanism for brake unit, to automatically make up for the extent of wear on the brake pad, the brake unit involving mainly a push unit that is driven by a swing member inside an outer casing, to push the brake block to the brake disc for braking operation. This invention is characterized in that, in the push unit is an automatic compensation mechanism, composed of a floating member, a shaft rod and a driving plate. The brake block is screwed to the floating member, to drive the floating member by means of the automatic compensation mechanism, so that after the brake block is worn, the floating member will be rotated to push out the brake block to make up for the extent of wear. Therefore, not only the service life of the brake block can be extended, a constant brake force can be maintained to upgrade safety.

4 Claims, 4 Drawing Sheets

AUTOMATIC COMPENSATION MECHANISM FOR BRAKE UNIT

BACKGROUND OF THE INVENTION

1. Field of the Invention

This invention is related to an automatic compensation mechanism for brake unit.

2. Description of the Prior Art

A disc brake involves a brake disc on one side of a rotating member, on two sides of the brake disc are the floating unit and brake unit. The floating unit and the brake unit will synchronously clasp the brake disc to achieve brake operation. Since its brake efficiency is far better than conventional swing-arm type brake units and lining plate brake, it is widely employed in the installation of brake devices, particularly regular bicycles, motorcycles and automobiles. Because the efficiency of a brake will significantly influence driving safety, most drivers and manufacturers have been seeking to upgrade brake efficiency.

The performance of a brake depends on various aspects, such as the extent of wear of the brake pad, the brake thrust, the material of brake pad and the contact area where the brake pad is clasped, etc. This invention aims at seeking improvement on the extent of wear on the brake pad. When a brake pad becomes thinner, the distance between the brake pad and the brake disc will be enlarged, resulting in smaller force applied by the brake pad on the brake disc, and its brake efficiency is impaired.

Therefore, when the brake pad is worn to some extent, the user will have to replace the brake pad, so that the braking performance can be maintained at its best working condition. But there is another problem. During the period before the brake pad is replaced, the distance between the brake pad and the brake disc is gradually lengthened. In other words, the brake efficiency deteriorates gradually, which may result in brake failure. Furthermore, in many cases when a brake pad is replaced, it is found that only about 20%–30% thickness of the brake pad is worn, which means unnecessary waste of the brake pad and increased maintenance cost of the brake unit.

SUMMARY OF THE INVENTION

This invention is related to an automatic compensation mechanism for brake unit.

It is the primary object of the present invention to provide an automatic compensation mechanism for brake unit, to automatically make up for the extent of wear on the brake pad, the brake unit involving mainly a push unit that is driven by a swing member inside an outer casing, to push the brake block to the brake disc for braking operation, characterized in that, in the push unit is an automatic compensation mechanism, composed of a floating member, a shaft rod and a driving plate, and the brake block is screwed to the floating member, to drive the floating member by means of the automatic compensation mechanism, so that after the brake block is worn, the floating member will be rotated to push out the brake block to make up for the extent of wear; therefore not only the service life of the brake block can be extended, a constant brake force can be maintained to upgrade safety.

It is another object of the present invention to provide an automatic compensation mechanism for brake unit which will achieve the following effects and performance: automatic compensation, consistent brake force and extended service life.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF PREFERRED EMBODIMENTS

Figure 1:
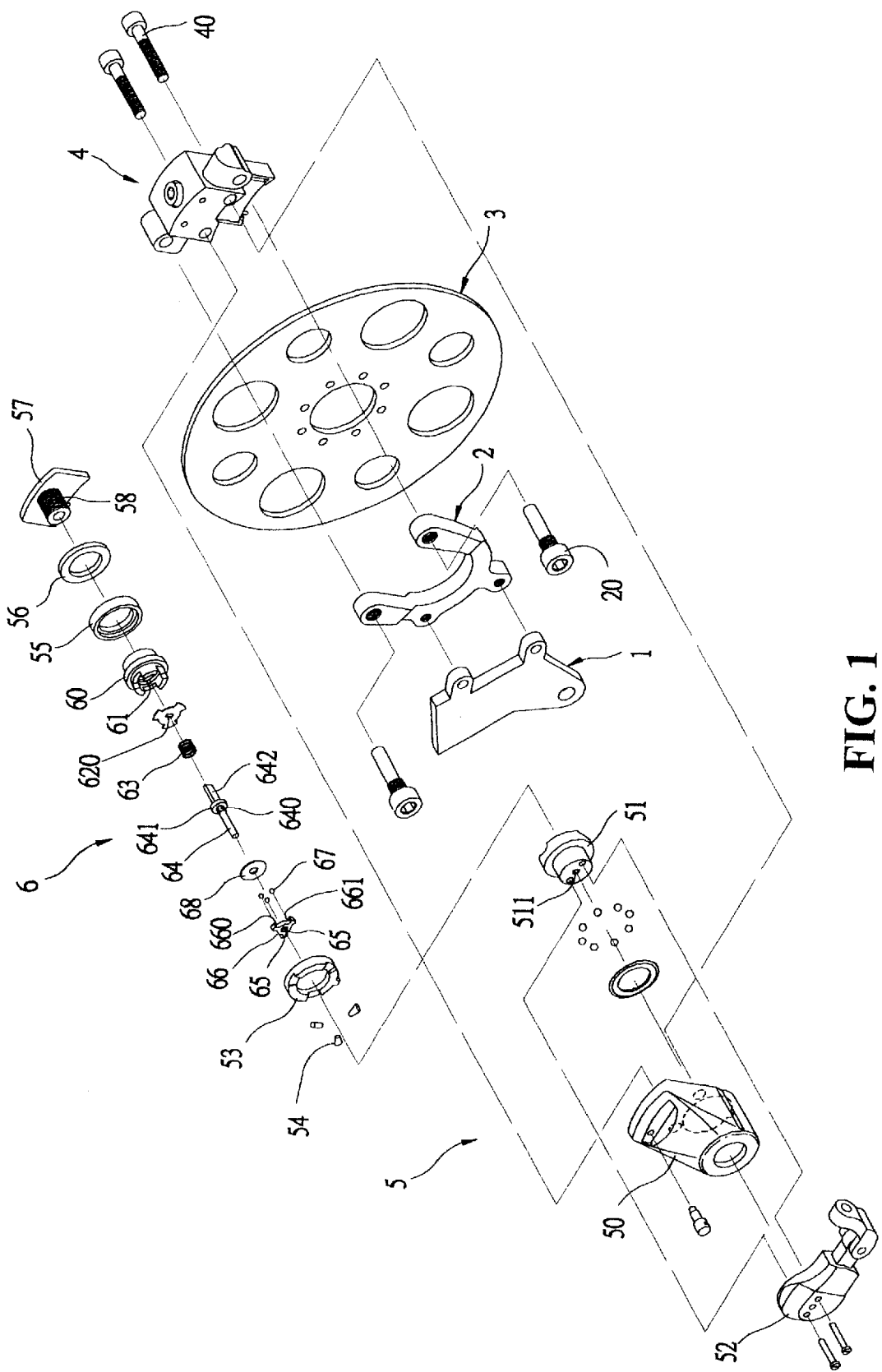
FIG. 1 is an exploded view of the invention of brake, showing the relations between all components of the automatic compensation mechanism and the brake.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

This invention relates to a brake with sustained braking performance, as shown in FIG. 1. Take a bicycle as an example; the brake involves mainly a locking member 2 on a fork 1. By way of a slide rod 20 having a floating unit 4 with a brake block on the other side of a brake disc 3, the floating unit 4 involving a bolt 40 that is fitted with a brake unit 5 connected to a brake wire, and the brake disc 3 located properly between the floating unit 4 and the brake unit 5, so the brake blocks of the floating unit 4 and the brake unit 5 can work together to clasp the brake disc 3, to achieve the purpose of brake function.

Figure 2:
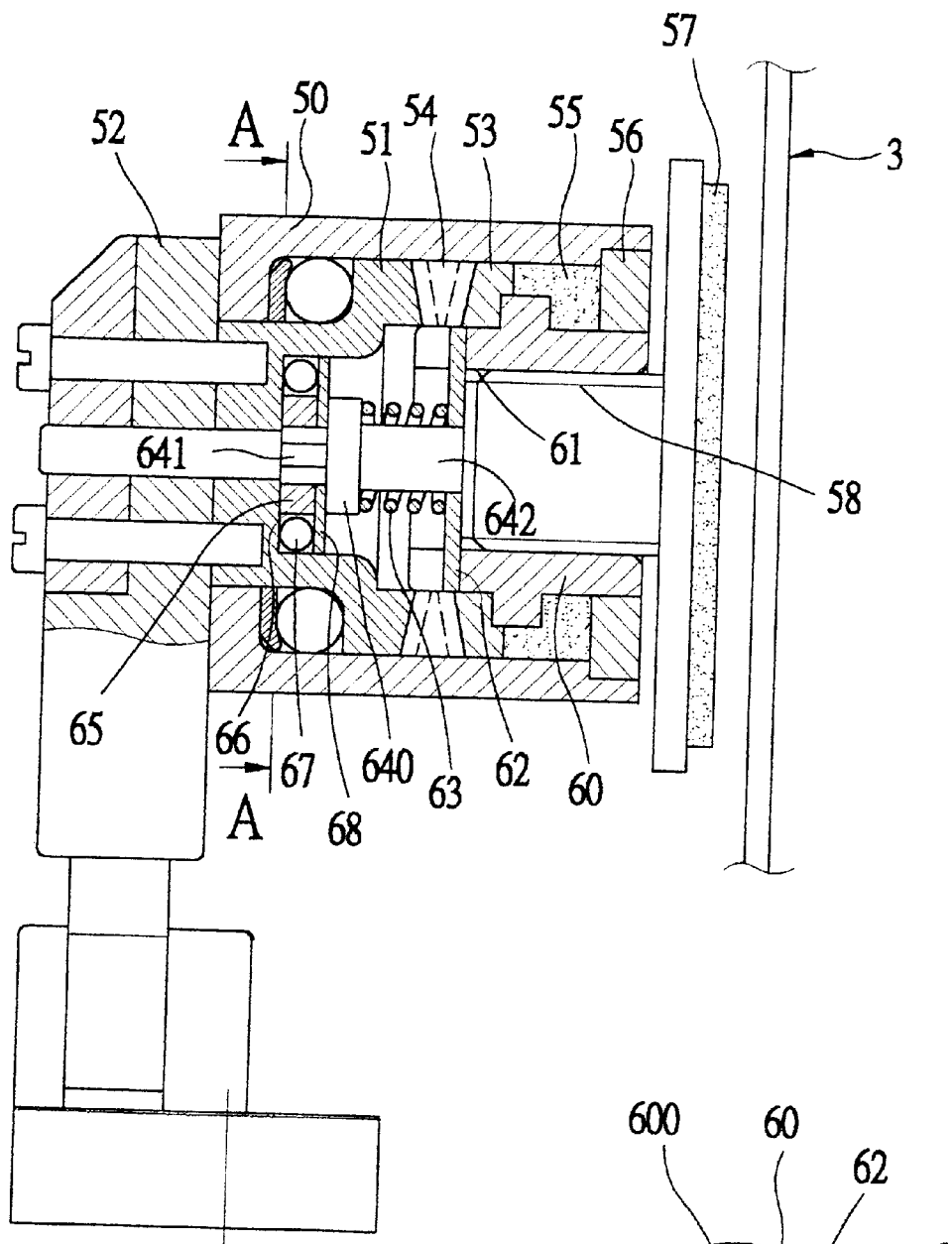
FIGS. 2 and 2A are sectional views of the invention of brake, showing the relations between all components.
Figure 2A:
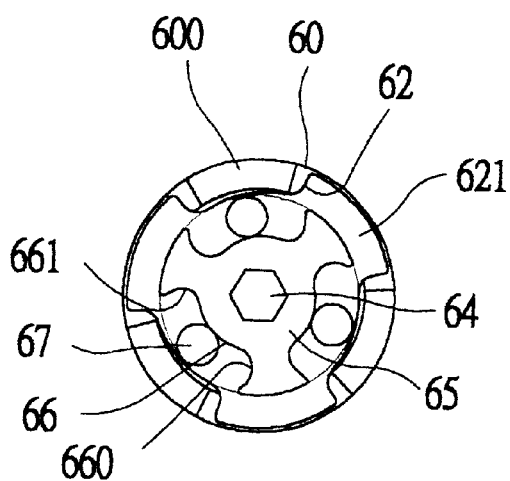

As shown in FIGS. 1, 2 and 2A, the brake unit 5 involves mainly an outer casing 50 with a thrust structure, the thrust structure can drive the brake block 57 to contact the brake disc 3. The thrust structure involves mainly a turning block 51 installed inside the outer casing 50, on the outside of the outer casing 50 is a swing member 52 that is connected to a brake wire, the swing member 52 is fitted with the turning block 51, so the swing member 52 can synchronously drive the turning block 51 to rotate. Inside the outer casing 50 on the other side of the turning block 51 is a push block 53, between the turning block 51 and the push block 53 is a series of cone-shaped roller posts 54, the push block 53 can be driven by the turning block 51 for parallel movement. On the other side of the push block 53 are arranged in sequential order a ring-shaped flexible member 55, a ring-shaped outer cover 56 and a brake block 57, so that the push block 53 can push out the brake block 57 after compressing the flexible member 55, and reset to its original position with the help of the flexible member 55.

The characteristics of this invention are shown in FIGS. 1, 2 and 2A. Inside the outer casing and at the rear of the turning block 51 of the thrust structure is an automatic compensation mechanism 6. The brake block 57 is linked onto the automatic compensation mechanism 6. The automatic compensation mechanism 6 has a hollow floating member 60 at the rear of the push block 53. At one end of the floating member 60 opposite the brake block 57 is an inner screw hole 61 to accommodate the insertion of a bolt 58 at the rear of the brake unit 57. Extended from the rim of the floating member 60 corresponding to the push block 53 is a series of equally spaced teeth 600. Between the teeth 600 of the floating member 60 is a tooth plate 62 having a tooth part 621 at its rim, the width of the tooth part 621 is smaller than the clearance of neighboring teeth 600. At the center of the tooth plate 62 is the formation of an elongated square positioning hole 620, which serves to accommodate the insertion of a shaft rod 64 after penetrating a spring 63;

The shaft rod 64 has a positioning section 642 to match the shape of the positioning hole 620. At the middle section of the shaft rod is the formation of a limiting flange 640, so the spring 63 can be pressed between the limiting flange 640 and the tooth plate 62. On the shaft rod 64 near the limiting flange 640 is the formation of a snap section 641 with a small section of multiple corners, to accommodate the insertion of a driving plate 65 and a cover hood 68 inside the turning block 51. At the center of the driving plate 65 is the formation of a snap hole 650 to match the snap section 641, so the driving plate 65 can rotate synchronously with the shaft rod 64. At the rim of the driving plate 65 is the formation of a series of guide grooves 66. On two sides of the guide grooves 66 is the formation of arch groove section 660 and flat cut section 661. Inside each guide groove 66 is a roller 67. When the roller 67 moves to the arc groove section 660, the roller 67 will rotate (as shown in FIG. 3A). When the roller 67 moves to the flat cut section 661, the roller 67 can be clasped between the inside edge of the turning block 51 and the flat cut section 661 of the guide groove 66, so the turning block 51 can synchronously drive the driving plate 65 to rotate (as shown in FIG. 4A). The cover hood 68 will restrict the roller 67 between the guide groove of the driving plate 65 and the turning block 51;

Therefore, the driving plate 65 can be positioned inside the turning block 51, and the roller 67 inside the guide grove 66, and restricted by the cover hood 68. Then, the catch section 641 of the shaft rod 64 is inserted inside the catch hole 650 of the driving plate 65. Then the spring 63 is fitted to the positioning section 642 of the shaft rod 64, and the tooth plate fitted to the positioning section 642, so that the teeth 600 of the floating member 60 are engaged onto the tooth plate 62. Finally, the brake block 57 is screwed by the bolt 58 to the floating member 60, to comprise a brake unit that automatically compensate wear on the brake block 57.

Figure 3:
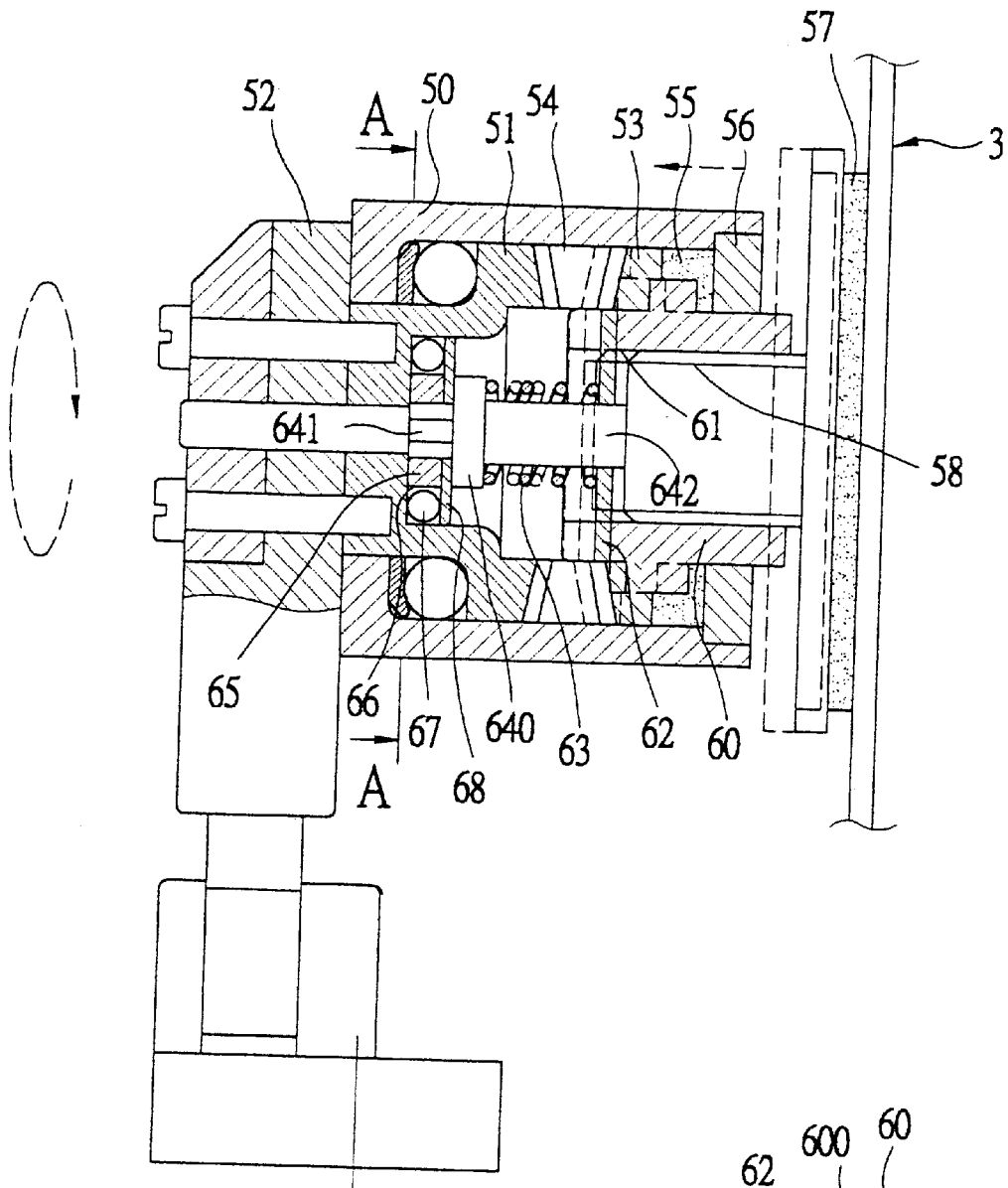
FIGS. 3 and 3A are schematic views of the invention in the process of braking operation.
Figure 3A:
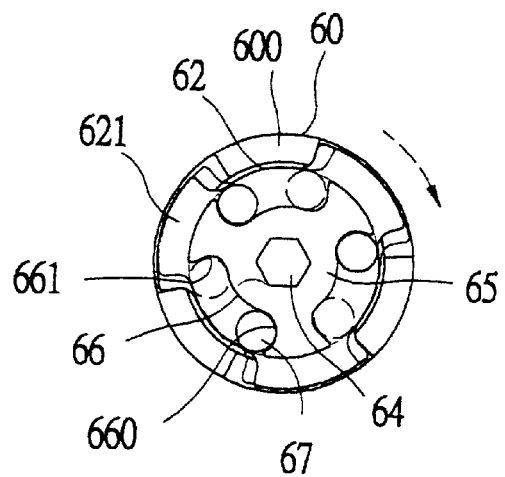
Figure 4:
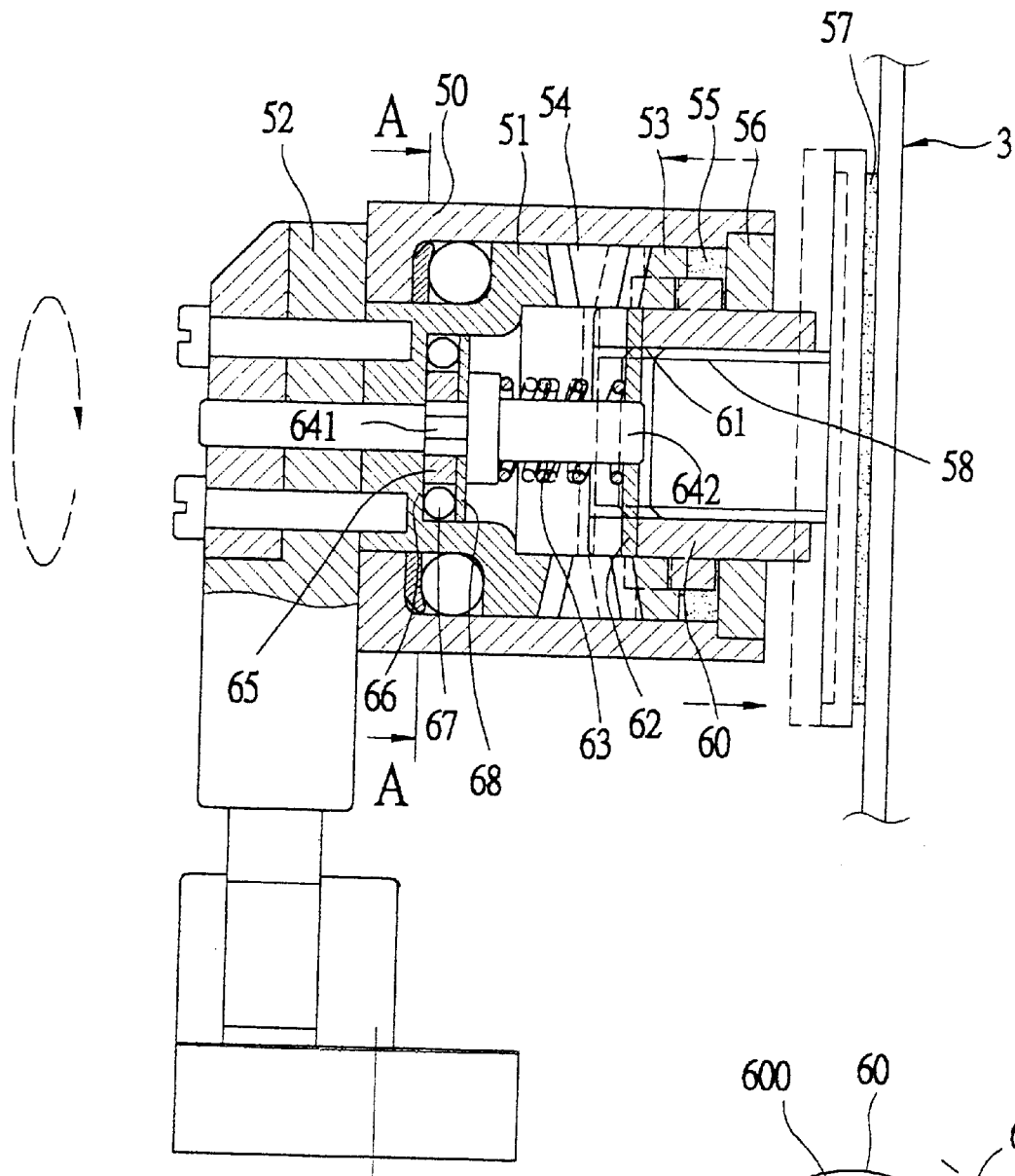
FIGS. 4 and 4A are schematic views of the invention in the process of automatic compensation.
Figure 4A:
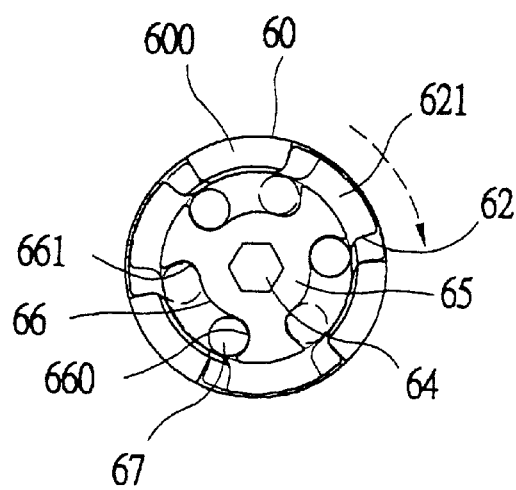

Application of this invention is shown in FIGS. 2, 3 and 4. Under a normal condition, when the user pulls the brake handle, the brake wire pulls the swing member 52 of the brake unit 5. Then the swing member 52 will synchronously rotate the turning block 51, and the roller post 54 will drive the push block 53 to move, and drive the floating member 60 to move simultaneously. So, the brake block 57 on the floating member 60 will come close to the brake disc 3 to accomplish braking operation. Meanwhile, the roller 67 of the automatic compensation mechanism in the turning block 51 will be touched by the inside edge of the turning block 51 to roll into the arc groove section 660 of the guide groove 66 of the driving plate 65. The roller 67 will rotate on its own axis inside the arc groove section 660 without driving any component;

However, when the brake block 57 becomes thinner from wear, the user can press the brake handle, and the brake unit will still be functioning. But when the brake handle is released, the swing member 52 will drive the turning block 51 to rotate. Then the turning block 51 will push the roller 67 inside the driving plate 65 to the flat cut section 661 of the guide groove 66. Since the height of the flat cut section 661 is less than the roller 67, the roller 67 will be caught between the turning block 51 and the driving plate 65. At this stage, the turning block 51 will synchronously drive the driving plate 65, and the driving plate 65 will drive the shaft rod 64. The shaft rod 64 drives the tooth plate 62. When the tooth part 621 of the tooth plate 62 reaches the teeth 600 on the floating member 60, the tooth plate 62 will push the floating member 60 to rotate, then the brake block 57 that is screwed onto the floating member 60 will move to the brake disc 3, maintaining a fixed clearance between the brake block 57 and the brake disc 3, thus to achieve the objective of sustaining a constant brake force, without changing the distance of the brake handle to be pressed by the user.

Through the above description, we can understand that the invention will achieve the following effects and performance:

1. Automatic Compensation

The special design of the guide groove 66 of the driving plate 65 inside the turning block 51 enables the roller 67 to rotate inside the guide groove 66 on its axis or to engage, depending on the direction of rotation, to drive the shaft rod 64, the tooth plate 62 and the floating member 60 to rotate, the brake block 57 to move out, therefore this invention will automatically make up for the extent of wear on the brake block and perform an automatic compensation function.

1. Consistent Brake Force

Activated by the automatic compensation mechanism 6, the brake block 57 performs an automatic compensation function to maintain a constant distance between the brake block 57 and the brake disc 3, therefore a steady brake force can be maintained to enhance driving safety, because the brake efficiency will not be affected by a worn brake block 57.

2. Extended Service Life

As described above, because the brake block 57 can automatically move forward to make compensation, the service life of the brake block 57 can be extended. The brake block 57 will not have to be replaced until after it is 70% or 80% worn. By extending its service life, maintenance costs can be reduced and the economic value of the brake can be upgraded.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An automatic compensation mechanism for brake unit, said brake unit involving a turning block installed inside an outer casing, on the outside of the outer casing being a swing member serving to drive the turning block, on the other side of the turning block inside the outer casing being a push block, said push block is driven by the turning block for parallel movement, on the other side of the push block being a brake block extending out of the outer casing, to perform brake operation on a brake disc; characterized in that: in the turning block is an automatic compensation mechanism, extending from the brake block toward the turning block is a bolt that is screwed onto the automatic compensation mechanism, at the rear of the push block being a floating member with an inner screw hole, on the other end of the floating member being a tooth plate, at the center of the tooth plate being a shaft rod, on the shaft rod being a driving plate and a cover hood, the driving plate being installed inside the turning block, at the rim of the driving plate being the formation of a series of guide grooves, on two sides of each guide groove being the formation of an arch groove section and a flat cut section, inside each guide groove being a roller, the arch groove section enabling the roller to rotate on its axis, the flat cut section working with the inside edge of the turning block to engage the roller, so the turning block can synchronously drive the driving plate to rotate, the cover hood restricting the roller in an area between the guide groove of the driving plate and the inside edge of the turning block, thereby comprising a brake unit with an automatic compensation function.

2. The automatic compensation mechanism for brake unit as claimed in claim 1, wherein extending from the floating member to match the rim of the push block is a series of equally spaced teeth, on the rim of the tooth plate being matching teeth, so the tooth plate and the floating member can be engaged.

3. The automatic compensation mechanism for brake unit as claimed in claim 2, wherein the width of a tooth part is smaller than the clearance of neighboring teeth, to provide proper turning clearance.

4. The automatic compensation mechanism for brake unit as claimed in claim 1, wherein at the center of the tooth plate is the formation of a positioning hole in the shape of an elongated square, the shaft rod forming a corresponding positioning section.

* * * * *